United States Patent
Okazaki et al.

(10) Patent No.: US 8,349,965 B2
(45) Date of Patent: Jan. 8, 2013

(54) FLUORORUBBER COMPOSITION CAPABLE OF FORMING CRACK-RESISTANT SEAL AND CRACK-RESISTANT SEAL FORMED FROM THE COMPOSITION

(75) Inventors: Masanori Okazaki, Gojyo (JP); Naoki Ohsumi, Gojyo (JP)

(73) Assignee: Nippon Valqua Industries, Ltd., Tokyo (JP)

( * ) Notice: Subject to any disclaimer, the term of this patent is extended or adjusted under 35 U.S.C. 154(b) by 99 days.

(21) Appl. No.: 12/922,903

(22) PCT Filed: Mar. 12, 2009

(86) PCT No.: PCT/JP2009/054773
§ 371 (c)(1),
(2), (4) Date: Sep. 16, 2010

(87) PCT Pub. No.: WO2009/116451
PCT Pub. Date: Sep. 24, 2009

(65) Prior Publication Data
US 2011/0009568 A1 Jan. 13, 2011

(30) Foreign Application Priority Data
Mar. 18, 2008 (JP) ................................. 2008-069611

(51) Int. Cl.
*C08F 14/18* (2006.01)
(52) U.S. Cl. ...................... 525/326.2; 525/149; 525/151; 525/313; 525/326.3; 525/326.4; 525/359.3; 525/383; 525/384; 525/387; 428/421; 524/342; 524/345; 524/348; 524/349; 524/394
(58) Field of Classification Search .................. 428/421; 525/149, 151, 313, 315, 326.2, 326.3, 326.4, 525/359.3, 383, 384, 387; 524/342, 345, 524/348, 349, 394
See application file for complete search history.

(56) References Cited

U.S. PATENT DOCUMENTS

| 4,708,988 A | * | 11/1987 | Tabb ............................. 525/194 |
| 5,412,034 A | * | 5/1995 | Tabb ............................. 525/194 |
| 2006/0041069 A1 | * | 2/2006 | Sumi et al. .................... 525/192 |
| 2009/0093590 A1 | | 4/2009 | Okazaki |
| 2009/0312473 A1 | | 12/2009 | Kanega et al. |

FOREIGN PATENT DOCUMENTS

| JP | 06302527 A | 10/1994 |
| JP | 07179704 A | 7/1995 |
| JP | 7316376 A | 12/1995 |
| JP | 10139968 A | 5/1998 |
| JP | 10139969 A | 5/1998 |
| JP | 2001114964 A | 4/2001 |
| JP | 2001164066 A | 6/2001 |
| JP | 2006228805 A | 8/2006 |
| JP | 2007131720 A | 5/2007 |
| JP | 2007137994 A | 6/2007 |

* cited by examiner

*Primary Examiner* — Robert C Boyle
(74) *Attorney, Agent, or Firm* — The Webb Law Firm

(57) ABSTRACT

A fluororubber composition according to the present invention contains 0.1 to 3 parts by weight of a polyol compound, 0.1 to 4 parts by weight of a peroxide crosslinking agent, and 1 to 9 parts by weight of a co-crosslinking agent per 100 parts by weight of a peroxide-crosslinkable fluoropolymer. A crack-resistant seal according to the present invention contains a crosslinked fluoropolymer and a polyol compound. The crack-resistant seal according to the present invention can be formed by crosslinking the fluororubber composition, and the resultant crack-resistant seal has particularly high crack resistance. With the fluororubber composition according to the present invention, a durable crack-resistant seal having high plasma resistance, crack resistance, and compression set and that produces few particles can be formed at low cost.

10 Claims, No Drawings

FLUORORUBBER COMPOSITION CAPABLE OF FORMING CRACK-RESISTANT SEAL AND CRACK-RESISTANT SEAL FORMED FROM THE COMPOSITION

TECHNICAL FIELD

The present invention relates to fluororubber compositions and seals formed from the compositions.

More specifically, the present invention relates to fluororubber compositions capable of forming crack-resistant seals and crack-resistant seals formed from the compositions.

BACKGROUND ART

Fluororubbers are known to have the following properties:

(1) having rubber elasticity which is a property intrinsic to rubber, like other general-purpose rubbers;

(2) having high chemical stability because the carbon chains therein are linked such that hydrogen atoms bonded to the carbon atoms are substituted by fluorine and also have no unsaturated bond; and (3) being superior to other general-purpose rubbers in properties such as heat resistance, oil resistance, chemical resistance, weather resistance, and ozone resistance.

With such properties, fluororubbers are used, for example, for rubber seals such as O-rings, formed mainly of synthetic rubber, containing rubber chemicals such as a crosslinking agent, a crosslinking aid, and a filler, and molded using a mold by hot pressing.

Such fluororubber seals are widely used for apparatuses and equipment in various industries because those seals are so flexible as to conform well to joined surfaces (such as flange surfaces) and have high sealability.

In particular, fluororubber seals are used in the semiconductor industry as, for example, seals in chemical lines for processes such as etching processes because fluororubber seals have high heat resistance and chemical resistance and produce only small amounts of particulates, or called particles, and gas.

Processes involving plasma treatment in semiconductor manufacturing use plasma gases such as $O_2$, $CF_4$, $O_2+CF_4$, $N_2$, Ar, $H_2$, $NF_3$, $CH_3F$, $CH_2F_2$, $C_2F_6$, $Cl_2$, $BCl_3$, tetraethoxysilane (TEOS), and $SF_6$. In particular, etching processes mainly use fluorocarbon gases, and ashing processes use mixed gases based on oxygen gas.

Seals conventionally used under plasma gas conditions are mainly formed from perfluoroelastomers (crosslinkable fluoropolymers fluorinated such that hydrogen atoms (H) in the side chains bonded to the main-chain C—C bonds are substantially completely substituted by fluorine atoms (F): classified as FFKM) for their high plasma resistance.

Perfluoroelastomers, however, are extremely expensive. Accordingly, less expensive crosslinkable fluoropolymers (unvulcanized fluororubber polymers in which hydrogen atoms (H) in the side chains bonded to the main-chain C—C bonds are incompletely substituted by fluorine atoms (F) and which partially contain hydrogen atoms (H): classified as FKM) have increasingly been used as seals for semiconductor manufacturing apparatuses at sites to be sealed in mild plasma environments.

However, seals have recently been used in severer environments with shrinking semiconductor design rules and increasing throughput (amount processed per unit time).

A seal is often attached to the place to be sealed so as to be stretched to some extent, for example, for ease of attachment and prevention of detachment, and also to be compressed for sufficient sealability.

If the seal is exposed to a plasma irradiation atmosphere, the rubber is degraded by plasma irradiation, and its weight decreases as the rubber component volatilizes from the surface of the seal.

In addition, the seal tends to crack when irradiated with plasma, and if the crack is severe, it may cause the seal to fracture. This causes problems such as increased maintenance operations for semiconductor manufacturing apparatuses due to shortened seal lives with degraded seal performance.

In general, a seal is often attached to a groove in a slightly stretched state; this stretching further promotes cracking. In addition, if a crack reaches the seal surface beyond the site being irradiated with plasma, it causes leakage and brings serious problems, such as a system failure, in manufacturing processes, thus leading to extensive damage.

Furthermore, fluororubbers conventionally used for seals contain a filler such as carbon black, silica, barium sulfate, or titanium oxide for improved properties at normal state, including mechanical strength and compression set, or as an extender for cost reduction.

In polyol vulcanization and amine vulcanization, additionally, a vulcanizing agent needs to be used in combination with a compound of metal such as a magnesium, lead, calcium, aluminum, or zinc as an acid acceptor. In polyol vulcanization, furthermore, a calcium hydroxide needs to be used in combination as a cocatalyst.

Such inorganic fillers contribute to production of particles (particulates) in plasma irradiation equipment, whereas it is difficult to form a seal having necessary properties at normal state using a fluororubber formed without an inorganic filler for reduction of particles produced.

In addition, because a deteriorated seal itself can produce particles even if no inorganic filler is used, a reduction in the amount of particles produced, in other words, an improvement in plasma resistance, is demanded of organic polymer materials used for seals themselves.

Accordingly, there has been a desire for a fluororubber seal having not only high plasma resistance (associated with the rate of weight loss), but also high crack resistance upon plasma irradiation and compression set (both associated with seal life), producing no particles, and being less expensive and more durable.

JP-A No. 6-302527 (Patent Document 1) proposes a silica-containing seal for semiconductor manufacturing apparatuses. The seal for semiconductor manufacturing apparatuses, however, has a problem in that it has insufficient crack resistance and produces particles originating from silica.

In addition, JP-A No. 2001-114964 (Patent Document 2) proposes a rubber composition, for a plasma-resistant seal, containing a fluororubber and a polyamine crosslinking agent, and JP-A No. 2001-164066 (Patent Document 3) proposes a rubber composition in which a polyamine crosslinking agent, and a polyol crosslinking agent are added to a fluororubber. These rubber compositions, however, have a problem in that they have insufficient plasma resistance and the metal oxide used as an acid acceptor for vulcanization contributes to production of particles.

Furthermore, JP-A No. 2007-137994 (Patent Document 4) proposes a fluorine-containing alloyed copolymer containing a fluororubber and resinous tetrafluoroethylene-perfluoroalkyl vinyl ether. The fluorine-containing alloyed copolymer, however, has a problem in that it has insufficient crack resistance and therefore fails to provide a sufficient seal life.

In addition, JP-A No. 2006-228805 (Patent Document 5) proposes a seal, for semiconductor manufacturing apparatuses, formed from a perfluoroelastomer blended with FKM for improved crack resistance. The seal for semiconductor manufacturing apparatuses, however, has a problem in that it has insufficient crack resistance and is more expensive than those formed only of a fluororubber because it uses a perfluoroelastomer.

An object of the present invention is to solve the above problems accompanied with the conventional art.

SUMMARY OF THE INVENTION

More specifically, an object of the present invention is to provide a fluororubber composition capable of forming a crack-resistant seal that exhibits-high crack resistance in a plasma environment without losing its performance as a seal, and also to provide a crack-resistant seal formed from the rubber composition.

More specifically, an object of the present invention is to provide a fluororubber composition capable of forming a crack-resistant seal that has not only high plasma resistance but also high crack resistance and compression set, that produces no particles, and that is less expensive and more durable, and also to provide a crack-resistant seal formed from the rubber composition.

DETAILED DESCRIPTION OF THE INVENTION

To solve the above problems, the present inventors have made an intensive study to achieve the above rubber composition and the crack-resistant seal formed from the rubber composition. As a result, the present inventors have found that a crack-resistant seal that can achieve the above objects can be formed from a fluororubber composition obtained by mixing a polyol compound with a peroxide-crosslinkable fluoropolymer, a peroxide crosslinking agent, and a co-crosslinking agent, thus completing the present invention.

That is, the fluororubber composition according to the present invention contains 0.1 to 3 parts by weight of a polyol compound, 0.1 to 4 parts by weight of a peroxide crosslinking agent, and 1 to 9 parts by weight of a co-crosslinking agent per 100 parts by weight of a peroxide-crosslinkable fluoropolymer.

In the present invention, the polyol compound is preferably a bisphenol from the viewpoint that a seal having particularly high crack resistance can be produced.

The crack-resistant seal according to the present invention comprises a crosslinked fluoropolymer and a polyol compound.

The crack-resistant seal according to the present invention is preferably formed by crosslinking the above fluororubber composition from the viewpoint that a crack-resistant seal having particularly high crack resistance can be formed.

The crack-resistant seal according to the present invention preferably contains a bisphenol, particularly, Bisphenol AF, from the viewpoint that such a seal has particularly high crack resistance.

ADVANTAGES

According to the present invention, a fluororubber composition capable of forming a crack-resistant seal is provided. In addition, a crack-resistant seal formed from the composition exhibits high crack resistance in a plasma environment without losing its performance as a seal.

Further, with the fluororubber composition according to the present invention, a durable crack-resistant seal having high plasma resistance, crack resistance, and compression set and producing few particles can be formed at low cost.

Furthermore, if the polyol compound contained in the fluororubber composition is a bisphenol, particularly, Bisphenol AF, a seal having particularly high crack resistance can be formed.

BEST MODES FOR CARRYING OUT THE INVENTION

The fluororubber composition and the seal formed from the composition according to the present invention will be specifically described below.

Fluororubber Composition

The fluororubber composition according to the present invention contains 0.1 to 3 parts by weight of a polyol compound, 0.1 to 0.4 parts by weight of a peroxide crosslinking agent, and 1 to 9 parts by weight of a co-crosslinking agent per 100 parts by weight of a peroxide-crosslinkable fluoropolymer and is capable of forming a crack-resistant seal.

[Crosslinkable Fluoropolymer]

The crosslinkable fluoropolymer used in the present invention is peroxide-crosslinkable, and a known crosslinkable fluoropolymer may be used. Of these, a fluoropolymer (FKM) in which hydrogen atoms (H) in the side chains bonded to the main-chain C—C bonds are incompletely substituted by fluorine atoms (F) and which partially contain hydrogen atoms (H) is preferred in view of manufacturing costs.

Specific examples include tetrafluoroethylene/hexafluoropropylene/vinylidene fluoride copolymers (such as "DAI-EL G912," manufactured by Daikin Industries, Ltd.), tetrafluoroethylene/perfluoroalkyl vinyl ether/vinylidene fluoride copolymers (such as "DAI-EL LT302," manufactured by Daikin Industries, Ltd.), vinylidene fluoride-hexafluoropropylene copolymers, ethylene-perfluoroalkyl vinyl ether-tetrafluoroethylene copolymers, and tetrafluoroethylene-propylene copolymers.

In addition, commercial products may be used, including "DAI-EL series," manufactured by Daikin Industries, Ltd., "Viton series," manufactured by DuPont Dow Elastomers, "Tecnoflon series," manufactured by Solvay Solexis, "Dyneon fluororubber," manufactured by Sumitomo 3M Limited, and "Fluon AFLAS series," manufactured by Asahi Glass Co., Ltd.

Of these, tetrafluoroethylene/hexafluoropropylene/vinylidene fluoride copolymers and tetrafluoroethylene/perfluoroalkyl vinyl ether/vinylidene fluoride copolymers are preferred from the viewpoint that the seal formed from the fluororubber composition of the present invention achieves high plasma resistance. These copolymers may be used alone or as a mixture of two or more.

[Peroxide Crosslinking Agent]

The peroxide crosslinking agent contained in the fluororubber composition of the present invention can crosslink the composition without a crosslinking aid (acid acceptor), such as magnesium oxide or calcium oxide, used for polyol vulcanization or polyamine vulcanization. The use of the peroxide crosslinking agent thus provides the advantage of causing no particles originating from the crosslinking aid (acid acceptor).

A wide variety of known crosslinking agents for peroxide vulcanization may be used.

Specific examples include 2,5-dimethyl-2,5-di(t-butylperoxy)hexane (the trade name "PERHEXA 25B," manufactured by NOF Corporation), dicumyl peroxide (the trade name "PERCUMYL D," manufactured by NOF Corporation), 2,4-dichlorobenzoyl peroxide, di-t-butyl peroxide, t-butyl dicumyl peroxide, benzoyl peroxide (the trade name "NYPER B," manufactured by NOF Corporation), 2,5-dimethyl-2,5-(t-butylperoxy)hexyne-3 (the trade name "PERHEXYNE 25B," manufactured by NOF Corporation), 2,5-dimethyl-2,5-di(benzoylperoxy)hexane, α,α'-bis(t-butylperoxy-m-isopropyl)benzene (the trade name "PERBUTYL P," manufactured by NOF Corporation), t-butylperoxy isopropyl carbonate, and p-chlorobenzoyl peroxide.

Of these, 2,5-dimethyl-2,5-di(t-butylperoxy)hexane and α,α'-bis(t-butylperoxy)diisopropylbenzene are preferred, and 2,5-dimethyl-2,5-di(t-butylperoxy)hexane is particularly preferred, from the viewpoint that a seal having favorable properties at normal state and compression set can be formed.

Among those crosslinking agents, one crosslinking agent, or two or more crosslinking agents in combination may be used.

The amount of the crosslinking agent to be added is typically 0.1 to 4.0 parts by weight, preferably 0.3 to 2.0 parts by weight, and more preferably 0.5 to 1.5 parts by weight per 100 parts by weight of the crosslinkable fluoropolymer.

Adding the crosslinking agent within such a range is preferred from the viewpoint that a seal having favorable properties at normal state and compression set may be formed.

[Co-Crosslinking Agent]

In peroxide vulcanization, a peroxide crosslinking agent is typically used in combination with a Co-crosslinking agent. A wide variety of known co-crosslinking agents (vulcanizing aids) may be used.

Specific examples include compounds capable of co-crosslinking with radicals, such as triallyl isocyanurate (the trade name "TAIC," manufactured by Nippon Kasei Chemical Co., Ltd.), triallyl cyanurate, triallyl formal, triallyl trimellitate, N,N'-m-phenylene bismaleimide, dipropargyl terephthalate, diallyl phthalate, and tetraallyl terephthalamide.

Of these, triallyl isocyanurate is preferred from the viewpoint that, for example, it has high reactivity and a seal having favorable heat resistance and compression set can be formed.

Among these co-crosslinking agents, one co-crosslinking agent, or two or more co-crosslinking agents in combination may be used.

The amount of the co-crosslinking agent to be added is typically 1 to 9 parts by weight, preferably 2 to 7 parts by weight, and more preferably 3 to 6 parts by weight per 100 parts by weight of the crosslinkable fluoropolymer.

Adding the co-crosslinking agent within such a range is preferred from the viewpoint that a seal having favorable properties at normal state and compression set can be formed.

[Polyol Compound]

In the present invention, the polyol compound added to the fluororubber composition along with the peroxide crosslinking agent and the co-crosslinking agent is used primarily to improve the crack resistance of the seal formed from the fluororubber composition of the present invention.

Although the polyol compound added in the present invention may be one that can be used as a polyol crosslinking agent, the polyol compound is added not necessarily for the purpose of polyol vulcanization, and a polyol crosslinking aid (acid acceptor), such as magnesium oxide and calcium hydroxide, typically used in combination for polyol vulcanization is not necessarily needed.

This raises a presumption that the polyol compound in the seal of the present invention does not normally react with the peroxide-crosslinkable fluoropolymer.

The polyol compound is presumed to not react with the peroxide-crosslinkable fluoropolymer from the fact that crosslinking of a fluoropolymer with a polyol compound needs the following compounds:

(1) a quaternary ammonium salt, or a quaternary onium salt, serving as a catalyst; and (2) a metal compound such as calcium hydroxide, serving as a co-catalyst, or MgO, serving as an acid acceptor.

That is, if a polyol compound that can be used as a polyol crosslinking agent is used in the present invention, the polyol compound added serves as a filler for providing (forming) a seal having high crack resistance. This is one of the features of the present invention not found in the conventional purposes of the use of a polyol compound capable of polyol vulcanization.

A wide variety of known polyol compounds may be used. Examples include bisphenols such as 2,2-bis(4-hydroxyphenyl)perfluoropropane (Bisphenol AF), 2,2-bis(4-hydroxyphenyl)propane (Bisphenol A), and bis(4-hydroxyphenyl)sulfone (Bisphenol S), and salts of these compounds such as alkali metal salts and alkaline earth metal salts. The polyol compounds also include those capable of polyol vulcanization and are not limited to the above polyhydroxy aromatic compounds.

Of the polyol compounds, Bisphenol AF, Bisphenol A, etc. are preferred, and the use of Bisphenol AF is particularly preferred from the viewpoint that the resultant seal has high crack resistance and Bisphenol AF has good compatibility with the fluororubber.

The polyol compounds may be used alone or as a mixture of two or more.

The polyol compound may be mixed in the base polymer in advance as a masterbatch. One example of an available masterbatch of Bisphenol AF is "Curative VC-30" (50% active ingredient, manufactured by DuPont Dow Elastomers).

It is desirable that the amount of the polyol compound to be added is typically 0.1 to 3 parts by weight, preferably 0.1 to 2 parts by weight, and more preferably 0.1 to 1.0 part by weight per 100 parts by weight of the crosslinkable fluoropolymer.

Adding the polyol compound within the above range is preferred because the resultant seal has high crack resistance, compression set, and vulcanization rate.

If the polyol compound of an amount smaller than the above range is added, the resultant seal tends to lack crack resistance. On the other hand, if the polyol compound of an amount larger than the above range is added, the resultant seal tends to have low compression set, and the resultant fluororubber composition tends to have a lower vulcanization rate.

Thus, if the polyol compound over or under the above range is added, the resultant fluororubber composition or seal may have a problem with seal performance or seal manufacturing and may fail to serve as a practical product.

[Reinforcing Agent or Filler]

Examples of reinforcing agents or fillers include carbon black, fluororesins, silica, clay, silicate, alumina, aluminum hydroxide, calcium carbonate, silicic acid compounds, and fine particles of various resins. For example, the amount of these reinforcing agents and fillers to be used is about 1 to 50 parts by weight per 100 parts by weight of the crosslinkable fluoropolymer.

These reinforcing agents and fillers can be used as needed to adjust the physical properties (such as tensile strength, compression set, elongation, and hardness) of the resultant seal to those appropriate as a rubber seal. For semiconductor applications, however, a filler-free or inorganic-filler-free composition is often desirable because, when a rubber seal is etched by plasma, a filler contained therein may scatter as particles and impair the production efficiency of semiconductor manufacturing.

That is, it is preferable in the present invention that the seal and the composition for forming the seal do not substantially contain a filler such as silica, carbon black, clay, silicate, alumina, calcium carbonate, mica, barium sulfate, or titanium oxide from the viewpoint that the resultant seal produces no particles when etched by plasma.

[Other Ingredients]

Furthermore, other known ingredients, such as a plasticizer and a processing aid, may be added as needed for improved workability or adjustment of physical properties so as not to impair the conventional properties. For semiconductor applications, however, such ingredients are preferably not contained because they may volatilize, dissolve, or deposit from the seal inside a semiconductor manufacturing apparatus and may impair the production efficiency of semiconductor manufacturing.

[Method for Producing Fluororubber Composition and Seal Formed from the Composition]

The above rubber composition and seal according to the present invention may be produced by a known method.

Specifically, for example, the crosslinkable fluoropolymer is kneaded using a mixer such as an open-roll mill, a Banbury mixer, a pressure kneader, or a two-roll mill and, if necessary, is kneaded with a processing aid, a filler, a plasticizer, and an acid acceptor. The fluoropolymer is then kneaded with the polyol compound and the co-crosslinking agent and is finally kneaded with the peroxide vulcanizing agent to prepare a rubber compound (fluororubber composition).

The rubber compound (that is, the fluororubber composition of the present invention) is then charged into a mold of predetermined shape and is shaped by hot pressing at a heating temperature of 100° C. to 200° C. for about 0.5 to 120 minutes to form a predetermined molded rubber such as a seal.

In the present invention, the molded rubber is preferably subjected to secondary vulcanization in, for example, an oven for a predetermined period of time (for example, at about 150° C. to 250° C. under normal pressure for about 4 to 48 hours).

More preferably, the secondary vulcanization is carried out in a vacuum to reduce outgassing and production of particles from the molded rubber, which causes a problem in semiconductor manufacturing.

The rubber composition and seal of the present invention may be produced by a known method.

Specifically, the rubber ingredient is kneaded using a mixer such as an open-roll mill, a Banbury mixer, or a two-roll mill and is kneaded with other ingredients such as the crosslinking agent to prepare the rubber compound.

The rubber compound is then charged into a mold of predetermined shape and is shaped by hot pressing to form a predetermined molded rubber.

Furthermore, the molded rubber is preferably subjected to secondary vulcanization in, for example, an air reflux electric furnace or a vacuum electric furnace for a predetermined period of time. The secondary vulcanization sufficiently completes the vulcanization reaction and also reduces outgassing and production of particles, which causes a problem, particularly, in semiconductor manufacturing.

[Crack-Resistant Seal]

The crack-resistant seal of the present invention is a seal having high crack resistance, formed by peroxide vulcanization of the fluororubber composition of the present invention comprising the crosslinkable fluoropolyether, the polyol compound, and the peroxide crosslinking agent.

In addition, the crack-resistant seal of the present invention has high plasma resistance and produces no particles originating from the seal upon plasma irradiation of workpieces, for example, in semiconductor manufacturing processes, and is also durable with high crack resistance and compression set resistance.

EXAMPLES

The fluororubber composition and the crack-resistant seal according to the present invention will be more specifically described with reference to the examples below, although the examples do not limit the present invention.

As is obvious from a comparison between the examples and the comparative examples below, the seal formed from the fluororubber composition of the present invention has plasma resistance (high crack resistance) and, particularly, is less likely to suffer cracking due to plasma, which has been a problem. Thus, the seal has advantages as various rubber components such as seals for semiconductor processing apparatuses used in plasma processes, which include plasma etching, plasma ashing, and CVD, and which is frequently used in semiconductor manufacturing.

(3-1) Method for Shaping Samples

Samples were formulated under the conditions shown in Table 1 and were kneaded in an open-roll mill to prepare rubber compounds (fluororubber compositions), and they were set in molds. The rubber compounds set in the molds were then shaped at a pressure of 50 kgf/cm$^2$ using a 50 t compression vacuum press under heating at 160° C. for 30 minutes and were then subjected to secondary vulcanization in a vacuum in a vacuum electric furnace (degree of vacuum: 14 Pa) at 180° C. to 230° C. for 16 hours to form molded O-rings (seals).

Size of O-rings: AS568B-214; inner diameter: 24.99 mm; cross-sectional diameter: 3.53 mm (3-2) Measurement Methods for Evaluation Items (1) Plasma Resistance (Rate of Weight Loss)

The samples were irradiated with plasma for six hours using a plate plasma processing apparatus (manufactured by Hirano Koh-On Co., Ltd.) having an electrode diameter of 100 mm and an interelectrode distance of 50 mm at an RF power of 300 W, a gas flow ratio of $O_2:CF_4=9:1$, a gas flow rate of 200 sccm, and a degree of vacuum of 1 torr.

The samples were set 10 cm apart from the plasma electrode. Subsequently, the weights of the samples before and after the test were measured to determine the rates of weight (mass) loss (%) according to the following formula for evaluation of plasma resistance:

$$\text{Rate of weight loss (rate of mass loss (\%)) of sample} = [(x-y)/x] \times 100$$

where x is the mass (g) before the test, and y is the mass (g) after the test.

A lower rate of weight (mass) loss (%) indicates high plasma resistance.

(2) Crack Resistance

Samples were irradiated with plasma for two hours using a parallel-plate plasma processing apparatus (manufactured by Hirano Koh-On Co., Ltd.) having an electrode diameter of 100 mm and an interelectrode distance of 50 mm at an RF power of 300 W, a gas flow ratio of $O_2:CF_4=9:1$, a gas flow rate of 200 sccm, and a degree of vacuum of 1 torr, and were checked for cracking.

The samples used were "AS568B-214 O-rings". The O-rings were attached to cylinders so that the elongation in inner diameter was 28%, and were set 10 cm apart from the plasma electrode. The samples were checked for cracking using a microscope by magnifying the surfaces of the O-rings by 20 times.

(3) Compression Set

Among several items for evaluating physical properties of rubber seals, compression set is the most important evaluation item for determining seal life. Thus, the compression set of each sample was measured to determine whether each sample had the physical properties necessary for a semiconductor seal.

The compression set was measured by the method described in JIS K 6262.

The details are as follows.

Samples (AS214 O-rings) were held between iron plates at a compression rate of 25% and were heated in an electric furnace at 200° C. for 70 hours. The samples were then released from compression, and after allowing them to cool for 30 minutes, the compression set (%) was determined by calculating the amount of strain of the O-rings according to the following formula:

Compression set (%)={$T0-T1/T0-T2$}×100%

T0=height of O-ring before test (thickness of O-ring in central axis direction)
T1=height of O-ring 30 minutes after quick release from compression and removal of O-ring from compression plates
T2=thickness of spacers The ingredients used in the examples and the comparative examples (see Table 1) are as follows:

(a) FKM polymer 1: "DAI-EL G912," manufactured by Daikin Industries, Ltd.; tetrafluoroethylene/hexafluoropropylene/vinylidene fluoride copolymer; Mooney viscosity ($ML_{1+10}$, 100° C.): 76; specific gravity: 1.90; fluorine content: 71 wt %

(b) FKM polymer 2: "DAI-EL LT302," manufactured by Daikin Industries, Ltd.; tetrafluoroethylene/perfluoroalkyl vinyl ether/vinylidene fluoride copolymer; Mooney viscosity ($ML_{1+10}$, 100° C.): 65; specific gravity: 1.79, fluorine content: 62 wt %

(c) FKM polymer 3: "DAI-EL G701M BP," manufactured by Daikin Industries, Ltd.; hexafluoropropylene/vinylidene fluoride copolymer; Mooney viscosity ($ML_{1+10}$, 100° C.): 55; specific gravity: 1.81; fluorine content: 66 wt %

FKM polymer 4: "DAI-EL G621," manufactured by Daikin Industries, Ltd.; tetrafluoroethylene/hexafluoropropylene/vinylidene fluoride copolymer (masterbatch containing a quaternary ammonium salt and Bisphenol AF); Mooney viscosity ($ML_{1+10}$, 100° C.): 88; specific gravity: 1.90; fluorine content: 71 wt %

FKM polymer 5: "DAI-EL G801," manufactured by Daikin Industries, Ltd.; hexafluoropropylene/vinylidene fluoride copolymer; Mooney viscosity ($ML_{1+10}$, 100° C.): 66; specific gravity: 1.81; fluorine content: 66 wt %

(d) Bisphenol AF: 2,2-bis(4-hydroxyphenyl)perfluoropropane, manufactured by Tokyo Chemical Industry Co., Ltd.

(e) Bisphenol S: bis(4-hydroxyphenyl)sulfone, manufactured by Tokyo Chemical Industry Co., Ltd.

(f) Curative VC20: triphenylbenzylphosphonium chloride (masterbatch with 33% active ingredient), manufactured by DuPont. Dow Elastomers (g) Kyowamag #150: magnesium oxide, manufactured by Kyowa Chemical Industry Co., Ltd.

(h) Caldic #2000: calcium hydroxide, manufactured by Ohmi Chemical Industry Co., Ltd.

(i) TAIC: triallyl isocyanurate, manufactured by Nippon Kasei Chemical Co., Ltd.

(j) PERHEXA 25B: 2,5-dimethyl-2,5-di(t-butylperoxy)hexane, manufactured by NOF Corporation (k) PERBUTYL P: α,α'-bis(t-butylperoxy)diisopropylbenzene, manufactured by NOF Corporation Table 1 shows the formulation conditions of the samples in the examples and the comparative examples, and Table 2 shows the results of the individual tests.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| FKM polymer 1 | 100 | 0 | 50 | 100 | 100 | 100 | 0 | 100 | 100 | 100 |
| FKM polymer 2 | 0 | 100 | 50 | 0 | 0 | 0 | 0 | 0 | 0 | 0 |
| FKM polymer 3 | 0 | 0 | 0 | 0 | 0 | 0 | 0 | 0 | 0 | 0 |
| FKM polymer 4 | 0 | 0 | 0 | 0 | 0 | 0 | 0 | 0 | 0 | 0 |
| FKM polymer 5 | 0 | 0 | 0 | 0 | 0 | 0 | 100 | 0 | 0 | 0 |
| Bisphenol AF | 0.5 | 0.5 | 0.5 | 0.10 | 1.0 | 3 | 0.5 | 0 | 0.5 | 0.5 |
| Bisphenol S | 0 | 0 | 0 | 0 | 0 | 0 | 0 | 0.5 | 0 | 0 |
| Curative VC20 | 0 | 0 | 0 | 0 | 0 | 0 | 0 | 0 | 0 | 0 |
| Kyowamag 150 | 0 | 0 | 0 | 0 | 0 | 0 | 0 | 0 | 0 | 0 |
| Caldic 2000 | 0 | 0 | 0 | 0 | 0 | 0 | 0 | 0 | 0 | 0 |
| TAIC | 4 | 4 | 4 | 4 | 4 | 4 | 4 | 4 | 2.5 | 7 |
| PERHEXA 25B | 1.5 | 1.5 | 1.5 | 1.5 | 1.5 | 1.5 | 1.5 | 1.5 | 1.5 | 1.5 |
| PERBUTYL P | 0 | 0 | 0 | 0 | 0 | 0 | 0 | 0 | 0 | 0 |
| Total (parts by weight) | 106.0 | 106.0 | 106.0 | 105.65 | 108.5 | 108.5 | 106.0 | 106.0 | 104.5 | 111.0 |

|  | Ex. 11 | Ex. 12 | Ex. 13 | Ex. 14 | Com. Ex. 1 | Com. Ex. 2 | Com. Ex. 3 | Com. Ex. 4 | Com. Ex. 5 |
|---|---|---|---|---|---|---|---|---|---|
| FKM polymer 1 | 100 | 100 | 100 | 100 | 100 | 0 | 50 | 0 | 0 |
| FKM polymer 2 | 0 | 0 | 0 | 0 | 0 | 100 | 50 | 0 | 0 |
| FKM polymer 3 | 0 | 0 | 0 | 0 | 0 | 0 | 0 | 100 | 0 |
| FKM polymer 4 | 0 | 0 | 0 | 0 | 0 | 0 | 0 | 0 | 100 |
| FKM polymer 5 | 0 | 0 | 0 | 0 | 0 | 0 | 0 | 0 | 0 |
| Bisphenol AF | 0.5 | 0.5 | 0.5 | 0.5 | 0 | 0 | 0 | 2 | 0 |
| Bisphenol S | 0 | 0 | 0 | 0 | 0 | 0 | 0 | 0 | 0 |

TABLE 1-continued

| | | | | | | | | | |
|---|---|---|---|---|---|---|---|---|---|
| Curative VC20 | 0 | 0 | 0 | 0 | 0 | 0 | 0 | 4.5 | 0 |
| Kyowamag 150 | 0 | 0 | 0 | 0 | 0 | 0 | 0 | 3 | 3 |
| Caldic 2000 | 0 | 0 | 0 | 0 | 0 | 0 | 0 | 6 | 6 |
| TAIC | 4 | 4 | 4 | 4 | 4 | 4 | 4 | 0 | 0 |
| PERHEXA 25B | 3 | 0 | 0.5 | 1.0 | 1.5 | 1.5 | 1.5 | 0 | 0 |
| PERBUTYL P | 0 | 1.5 | 0 | 0 | 0 | 0 | 0 | 0 | 0 |
| Total (parts by weight) | 107.5 | 106.0 | 105.0 | 105.5 | 105.5 | 105.5 | 105.5 | 115.5 | 109.0 |

TABLE 2

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Pressing conditions (temp./time) | 160° C./30 min | 160° C./30 min | 160° C./30 min | 160° C./30 min | 160° C./30 min | 160° C./30 min | 160° C./30 min | 160° C./30 min | 160° C./30 min | 160° C./30 min |
| Secondary vulcanization conditions (temp./time) | 180° C./16 h | 180° C./16 h | 180° C./16 h | 180° C./16 h | 180° C./16 h | 180° C./16 h | 180° C./16 h | 180° C./16 h | 180° C./16 h | 180° C./16 h |
| Plasma resistance (rate of weight loss; %) | 2.1 | 4.3 | 3.5 | 2.0 | 2.1 | 2.3 | 4.7 | 2.3 | 2.2 | 2.3 |
| Crack resistance (crack) | No crack | No crack | No crack | No crack | No crack | No crack | No crack | No crack | No crack | No crack |
| Compression set (%) | 24 | 36 | 29 | 25 | 38 | 56 | 26 | 30 | 35 | 30 |

| | Ex. 11 | Ex. 12 | Ex. 13 | Ex. 14 | Com. Ex. 1 | Com. Ex. 2 | Com. Ex. 3 | Com. Ex. 4 | Com. Ex. 5 |
|---|---|---|---|---|---|---|---|---|---|
| Pressing conditions (temp./time) | 160° C./30 min | 160° C./30 min | 160° C./30 min | 160° C./30 min | 160° C./30 min | 160° C./30 min | 160° C./30 min | 160° C./30 min | 160° C./30 min |
| Secondary vulcanization conditions (temp./time) | 180° C./16 h | 180° C./16 h | 180° C./16 h | 180° C./16 h | 180° C./16 h | 180° C./16 h | 180° C./16 h | 230° C./24 h | 230° C./24 h |
| Plasma resistance (rate of weight loss; %) | 2.1 | 2.2 | 2.3 | 2.1 | 2.0 | 4.5 | 3.7 | 4.7 | 3.0 |
| Crack resistance (crack) | No crack | No crack | No crack | No crack | Crack | Crack | Crack | Crack | Crack |
| Compression set (%) | 28 | 32 | 34 | 31 | 23 | 34 | 30 | 28 | 45 |

The invention claimed is:

1. A fluororubber composition comprising a peroxide-crosslinkable fluoropolymer, a polyol compound, a peroxide crosslinking agent, a co-crosslinking agent, and no polyol crosslinking aid,
the fluororubber composition containing 0.1 to 3 parts by weight of the polyol compound, 0.1 to 4 parts by weight of the peroxide crosslinking agent, and 1 to 9 parts by weight of the co-crosslinking agent per 100 parts by weight of the peroxide-crosslinkable fluoropolymer.

2. The fluororubber composition according to claim 1, wherein the polyol compound is a bisphenol.

3. The fluororubber composition according to claim 1, wherein the polyol compound is Bisphenol AF.

4. A seal formed by crosslinking the fluororubber composition according to claim 1.

5. A seal comprising a crosslinked fluoropolymer and a polyol compound.

6. The seal according to claim 5, wherein the polyol compound is a bisphenol.

7. The seal according to claim 5, wherein the polyol compound is Bisphenol AF.

8. A seal formed by crosslinking the fluororubber composition according to claim 2.

9. A seal formed by crosslinking the fluororubber composition according to claim 3.

10. The seal according to claim 6, wherein the polyol compound is Bisphenol AF.

* * * * *